Nov. 7, 1967    S. A. MORSE    3,350,999
MEANS FOR RESTRICTING AND RELEASING THE OUTLET OF A BALER
Filed May 23, 1966    2 Sheets-Sheet 1

Inventor
Stanley A. Morse
By
Snow and Benno
Attys.

Nov. 7, 1967 S. A. MORSE 3,350,999
MEANS FOR RESTRICTING AND RELEASING THE OUTLET OF A BALER
Filed May 23, 1966 2 Sheets-Sheet 2

Inventor:
Stanley A. Morse
By Snow and Benno
Attys.

United States Patent Office 3,350,999
Patented Nov. 7, 1967

3,350,999
MEANS FOR RESTRICTING AND RELEASING THE OUTLET OF A BALER
Stanley A. Morse, Hammond, Ind., assignor to Arlo Manufacturing Corp., Hammond, Ind., a corporation of Indiana
Filed May 23, 1966, Ser. No. 552,015
4 Claims. (Cl. 100—43)

This invention relates generally to continuous type baling or packing machines, and more particularly to arrangements for restricting and releasing or relieving the outlet of such a baler.

The primary object of the present invention is to provide a novel arrangement for restricting and releasing the outlet of a baler in which the arrangement inherently uses a minimum of power, in which the operation is ideally suited to desirable bale forming requirements, and in which the adjustments are simple and positive.

It is a further object to provide a novel arrangement such as described in the previous paragraph in which the baler outlet releasing operation is correlated to and a function of the bale forming stroke.

Other objects and features of the invention will be apparent upon a perusal of the following specification and drawings in which.

Figure 1:
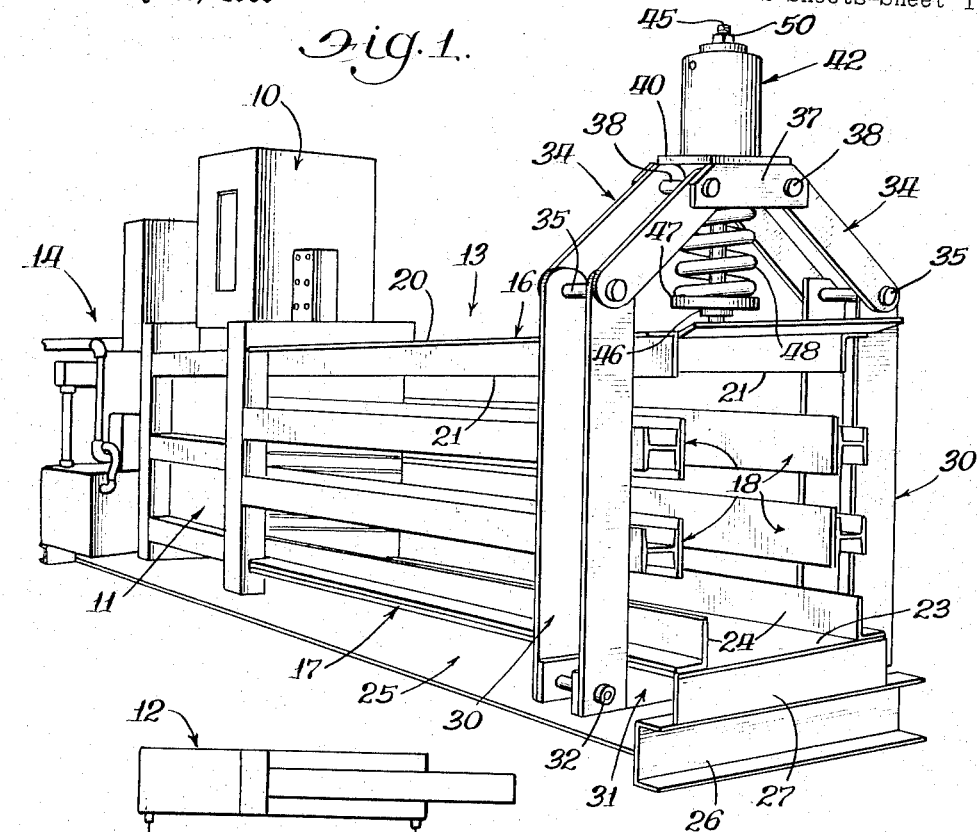
FIGURE 1 is a perspective view of a baler embodying the present invention.

The present embodiment is the preferred embodiment, but it is to be understood that changes can be made in the present embodiment by one skilled in the art without departing from the spirit and scope of the present invention.

Generally, the present invention is directed to open-chambered continuous baling machines which are generally horizontal stroking in the action of the bale forming plunger. In such machines the material to be baled is caused to move from the baling chamber outwardly of the outlet end of the baler as additional material is supplied to the inlet or hopper end of the baler. Many different arrangements have been provided in the art for restricting or otherwise holding back the forward end of the compacted material at the outlet end of the baler. The reason for such arrangements is to provide that the compacted material be of a relatively high density. The various known means for restricting the baler outlet have many different disadvantages. In some in which hydraulic forces are used to control the outlet pressure on the compacted material, extremely critical pressure adjustment is required even to produce a uniform hold-back frictional force of a suitable magnitude. Where a spring or springs are used alone, the maximum hold-back force is limited by the spring adjustment which the baling force can overcome by compressing the springs through a wedging action. In the subject invention the outlet of the baler is restricted by a spring arrangement. Hydraulic cylinder means are associated with the spring arrangement. The hydraulic cylinder means is connected into the hydraulic circuit which operates the bale forming plunger or ram. The various means and the hydraulic circuit are so constructed and arranged that during most of the bale forming stroke of the bale forming plunger, the hydraulic fluid pressure in the hydraulic cylinder means associated with the baler outlet spring restricting means is too low to cause any operation of that hydraulic cylinder means. The arrangement is further such that near the end of each bale forming stroke, when it is necessary to incrementally advance the leading end of the compacted material out of the baler outlet, the hydraulic fluid pressure rises to a point sufficient to cause operation of the hydraulic cylinder means to substantially counteract the spring means restricting the baler outlet. That counter-action causes a substantial release of the outlet restricting means and the compacted material is incrementally advanced for the remainder of the bale forming stroke. At the completion of the bale forming stroke the hydraulic fluid pressure is released, the hydraulic cylinder means will restore, and the spring operated restricting means for the baler outlet will again operate to restrict the baler outlet. An important feature of the present invention is that no hydraulic fluid pressures are used to power the baler outlet restricting means. During the major portion of the bale forming cycle the spring means for restricting the baler outlet provides relatively high restricting pressures. However, when almost the end of the bale forming cycle is reached and it is then desirable that the high pressure restricting means be released, the hydraulic cylinder means will be operated from the compacting plunger hydraulic circuit to substantially release the spring operated restricting means for the end portion of the bale forming cycle. As soon as the bale forming cycle is completed, full spring pressure is again immediately applied to the baler outlet for restriction thereof.

In detail, FIGURE 1 shows a continuous horizontal-stroke baler incorporating the present invention. Material to be baled is delivered to the hopper 10. From the hopper 10 the material is fed downwardly into the chamber 11. The chamber 11 includes a compacting head which is reciprocatingly moved by the bale forming plunger or hydraulic ram shown diagrammatically at 12 in FIGURE 2. The material in the chamber 11 is pushed therefrom and compacted in the baling chamber 13. Various controls including electrical and hydraulic control and circuit means are shown generally in FIGURE 1 rearwardly of the chamber 11 and indicated at 14. The baling chamber 13 comprises a top wall 16, a bottom wall 17, and side walls 18. The top wall 16 is generally defined by a horizontal flat plat 20 and depending side angle members 21 extending along each longitudinal edge of the plate 20. The rearward end of the top wall 16 is fixedly secured to the upper portion of the outlet of the chamber 11.

The bottom wall 17 comprises a horizontal plate 23 and upwardly extending angle memebrs 24 secured to the longitudinal side edges of the plate 23. The bottom wall 17 is longitudinally supported on laterally spaced apart angle members 25 which also extend under the chamber 11 to the rearward end of the baler. The forward ends of the angle or channel members 25 terminate in the supporting members 26 and 27 at the outlet end of the baler. The rearward end of the bottom wall 17 is fixedly secured across the lower end of the outlet of the chamber 11.

The side walls 18 each comprise a pair of vertical spaced apart channel members disposed between the top wall 16 and the bottom wall 17. The rearward end of each of the channel members of the side walls 18 is fixedly secured at the sides of the outlet of the chamber 11. The other or forward end of the channel members of the side walls 18 terminate in the baler outlet.

Vertically extending memebrs 30 are provided at the baler outlet. The lower end of each of the members 30 is pivotally connected to one end of a transversely disposed member 31. The member 31 extends immediately beneath and is secured to the bottom wall 17 at the baler outlet. Pin means 32 are provided for the pivotal connection of each of the members 30 to the memebr 31. The side walls 18 are secured to the horizontally extending members 30, and the members 30 extend from their connection with the side walls 18 upwardly and above the top wall 16.

Two pairs of link assemblies 34 are further provided. Each of the link members 34 comprises a pair of separate link members. One end of each of the link assemblies 34 is pivotally connected to the upper end of one of the memebrs 30 by pin means 35. The other end of each of the link assemblies 34 is pivotally connected to vertically disposed plates 37 by pin means 38. The plates 37 are secured to depend from a plate 40. From the foregoing it may be seen that any tendency to raise the plate 40 results in a tendency to pivot the vertical members 30 toward each other and thereby cause the side walls 18 at the outlet of the baler to move toward each other. Conversely, a downward movement of the plate 40 will result in an outward pivoting of the members 30 and a consequent spreading apart of the side walls 18.

A hydraulic cylinder 42 is carried on top of and secured to the plate 40 to extend upwardly therefrom. The piston and piston rod assembly 43 of the hydraulic cylinder 42 is hollow with the piston rod extending out of the upper end of the cylinder and being provided with stop means in the fully retracted position of the hydraulic cylinder 42. The hydraulic cylinder 42 is a one-way hydraulic cylinder so that the upper end of the interior of the cylinder is vented. Suitable seals are provided to prevent the escape of any hdraulic fluid from the lower portion of the cylinder below the piston. A threaded rod 45 extends through the plate 40, the cylinder 42 and through the hollow piston and piston rod 43 to extend from the upper end of the hydraulic cylinder 42. The lower end of the threaded rod 45 is fixedly secured to the horizontal plate 20 of the top wall 16 of the baler. A nut 46 is threaded on the lower end of the threaded rod 45. The circular plate 47 with a hole through the center thereof is loosely carried on the threaded rod 45 and rests upon the nut 46. A compressed coiled spring 48 is carried about the rod 45 and between the plates 40 and 47. A nut 50 is threaded on the upper end of the rod 25 and abuts against the upwardly extending end of the piston rod of the piston and rod assembly 43. From the foregoing it may be seen in regard to the material to be baled, which material is shown generally at 51 in FIGURES 2 and 3, that the material 51 will rest upon the bottom wall 17, and the top wall 16 will rest upon the top of the material 51. The compressed coiled spring 48 reacts through the plate 47, nut 46, and shaft 45 onto the top wall 16 and urges the plate 40 upwardly with a force dependent upon the threaded position of nut 46. The urging of the plate 40 upwardly results in a tendency of the vertical members 30 to be pivoted toward each other to thereby resulting a pressing of the side walls 18 against the sides of the material 51. The reaction force on the top wall 16 provides a downward pressure on the material to be baled and that reaction force is opposed by the bottom wall 17. The applied and reaction forces result in a restriction of the baler outlet to provide for and permit the forming of high density bales of material.

Figure 2:
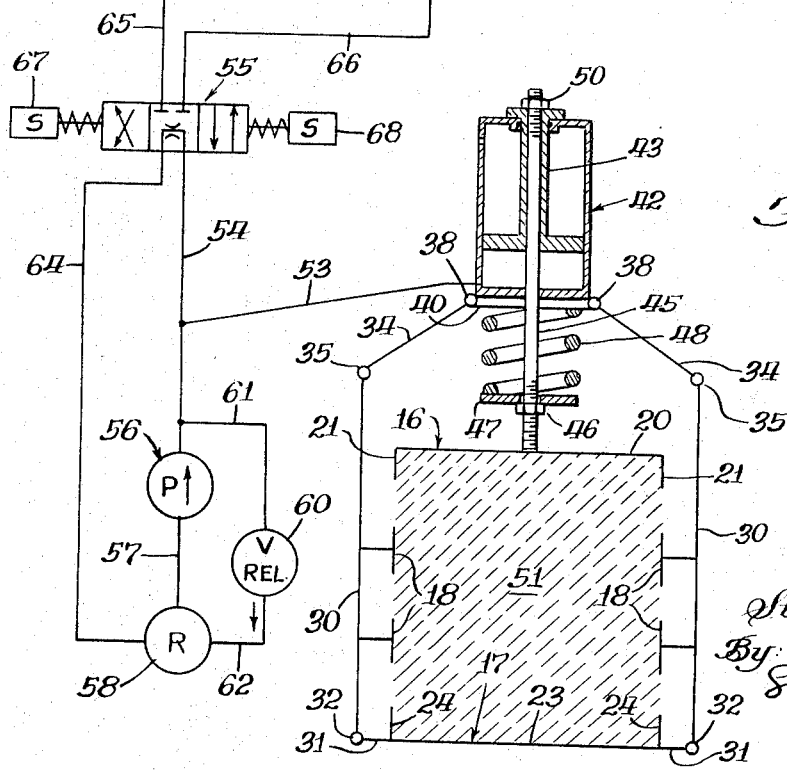
FIGURE 2 is a diagrammatic view of the hydraulic system for the bale forming plunger or ram and the baler outlet release means.
Figure 3:
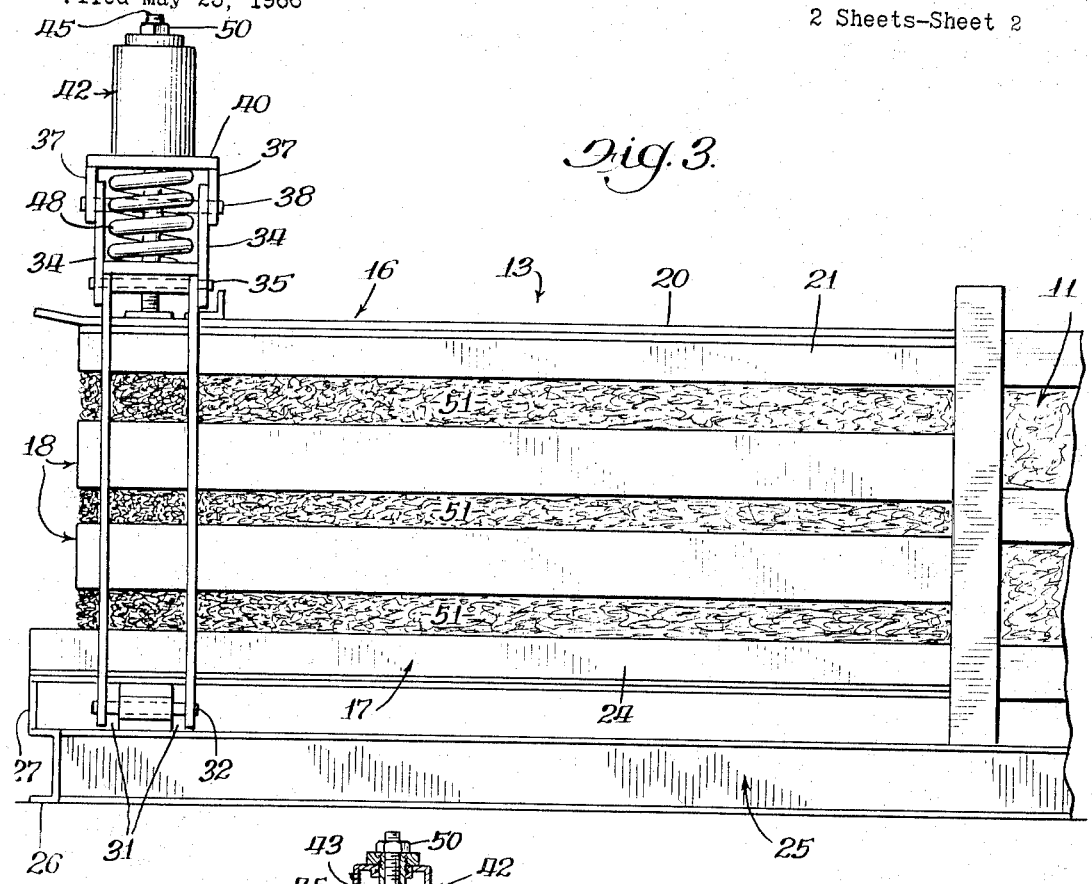
FIGURE 3 is a side elevational view of a portion of the structure shown in FIGURE 1.
Figure 4:
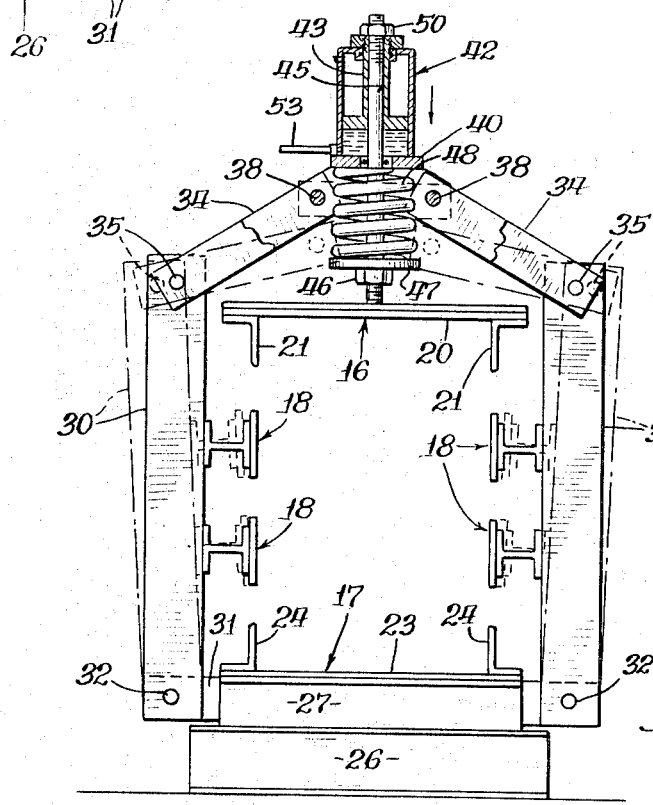
FIGURE 4 is an end elevational view of the structure shown in FIGURE 3 with portions thereof shown in cross section.

The unique hydraulic arrangement for releasing or relieving the spring means restricting the baler outlet at the end of each bale forming stroke is shown diagrammatically in FIGURE 2. The hydraulic components may be of any suitable construction known in the art. From the drawings it may be seen that if hydarulic fluid under sufficient pressure is delivered to the lower end of the cylinder assembly 42, the piston and rod assembly 43 will be forced upwardly to in turn urge the nut 50 carried on the shaft 45 upwardly. That operation of the hydraulic cylinder 42 will result in a movement of the plate 40 toward the plate 47 further compressing the coiled spring 48. The movement of the plate 40 toward the plate 47 will result in a tendency for outward pivoting of the members 30 and a consequent release of restricting pressure at the baler outlet on the material 51. If the hydraulic fluid under pressure is permitted to leave the lower portion of the cylinder 42, it may be seen that the coiled spring 48 may again react against the plate 47 to urge the plate 40 upwardly thereby again restricting the baler outlet.

Hydraulic fluid is delivered to and drained from the lower portion of the cylinder 42 by means of a hydraulic fluid conduit 53, one end of which is connected into the lower end of the hydraulic cylinder 42 and the other end of which is connected into a conduit 54. One end of the hydraulic fluid conduit 54 is connected to one port of a three position hydraulic valve 55. The other end of the fluid conduit 54 is connected to the outlet of a hydraulic fluid pump 56. The inlet of the pump 56 is connected by conduit 57 to a hydraulic fluid reservoir 58.

A pressure relief valve 60 is also provided. One side of the pressure relief valve 60 is connected by conduit 61 to the conduit 54 which is the outlet or high pressure side of the pump 56. The other side of the pressure relief valve 60 is connected by a conduit 62 to the hydraulic fluid reservoir 58. The pressure relief valve 60 automatically functions to prevent hydraulic fluid pressures in the system from exceeding a predetermined maximum. The maximum for which the pressure relief valve 60 is set must be greater than that pressure which is required to operate the hydraulic cylinder 42 to release or relieve the baler outlet restricting means.

A further hydraulic fluid conduit 64 is provided and is connected between a second port of the valve 55 and the hydraulic fluid reservoir 58.

The main hydraulic cylinder 12 which compacts the material 51 in the baling chamber 13 is double-acting. The head end of the hydraulic cylinder 12 is connected by conduit 65 into a third port of the valve 55 and the rod end of the cylinder 12 is connected by conduit 66 into a fourth port of the hydraulic fluid valve 55.

The hydraulic fluid valve 55 has three positions, the center position of which is the neutral position. The two other operative positions of valve 55 are achieved by a pair of solenoids 67 and 68. Any suitable electrical circuits known in the art may be provided for the operation of the solenoids 67 and 68. When both solenoids 67 and 68 are deenergized, the valve 55 is spring biased to the neutral position and in the neutral position conduit 54 is connected to conduit 64 and conduits 65 and 66 are blocked. Thus it may be seen that in the neutral position of the valve 55, the hydraulic cylinder 12 is in a hold position and hydraulic fluid from the outlet of the pump 56 is being dumped into the reservoir 58. No hydraulic fluid under pressure is then delivered to the hydraulic fluid cylinder 42 and the full baler outlet restricting force is applied.

When solenoid 68 is operated, hydraulic fluid conduit 54 is connected to conduit 66 and conduit 65 is connected to conduit 64 through the valve 55. This operation results in the application of hydraulic fluid under pressure to the rod end of the cylinder 12 with the head end of the cylinder 12 being vented to the reservoir 58. The resulting operation is a retraction of the bale forming or compacting cylinder or ram 12.

When solenoid 68 is deenergized and solenoid 67 is energized conduit 54 is connected to conduit 65 and conduit 66 is connected to conduit 64. This operation results in the application of hydraulic fluid under pressure to the head end of the cylinder 12 with the rod end thereof being vented to the reservoir 58. The hydraulic cylinder 12 will then extend in a bale compacting operation. During that compacting period the hydraulic fluid pressure in conduit 54 which is applied through conduit 53 to the hydraulic cylinder 42 is insufficient to cause any operation of the hydraulic cylinder assembly 42. In one reduction to practice of the subject invention, that fluid pressure was of the order of 200 to 300 p.s.i. As the cylinder 12 begins to reach the end of its bale forming stroke, resistance against compression is encountered and the hydraulic fluid pressure in the system begins to rapidly rise. Before the end of the stroke of the cylinder 12 that hydraulic fluid pressure reaches an amount sufficient to cause the operation of hydraulic cylinder 42 with a resultant release of outlet restricting pressure at the baler outlet. In one reduction to practice of the invention, the high pressure near the end of the bale compacting stroke was of the order of 1500 to 2000 p.s.i. The pressure at which the hydraulic cylinder 42 is operated is easily and simply varied by threading the nut 46 upwardly or downwardly on the shaft 45. With the subject arrangement it is easy to provide bales of uniform density.

At the extreme end of the bale forming stroke, solenoid 67 is deenergized and solenoid 68 is energized to retract the cylinder 12 in preparation of another bale forming stroke. The momentary release of baler outlet restricting pressure at the end of each bale forming stroke ideally permits an incremental advance of the bale material 51 out of the end of the bale chamber 13. This arrangement has many advantages all of which may not be readily apparent. In baling operations with the subject invention, the power consumption is efficiently used in bale formation and not wasted in excessive drag or in overcoming improperly applied restricting forces at the baler outlet. Further, when a baling machine according to the invention is shut down for periods of inactivity, hydraulic pressure need not be constantly supplied to maintain restriction at the baler outlet because the restriction forces are spring applied.

Having described the invention what is considered new and desired to be protected by Letters Patent is:

1. In a bailing machine, a hydraulically operated bale compacting cylinder, a hydraulic circuit for operating said compacting cylinder, a baling chamber having an inlet into which material is compacted by said compacting cylinder, said baling chamber terminating in a baler outlet, said baler outlet comprising spaced apart relatively movable bottom, top and side walls, a spring assembly, means mounting said spring assembly to relatively urge said walls together to restrict the size of said outlet, hydraulic cylinder means arranged in cooperation with said spring assembly so that said spring assembly is relieved to release said relative urging of said walls together responsive to an operation of said hydraulic cylinder means, and a second hydraulic circuit for operation of said hydraulic cylinder means, said second hydraulic circuit being formed and connected into said first hydraulic circuit so that said hydraulic cylinder means is operated during a period before completion of a compaction stroke of said compacting cylinder when the hydraulic fluid pressure in said compacting cylinder reaches a pre-determined value substantially above that hydraulic fluid pressure necessary to operate said compacting cylinder during the period of a compaction stroke prior to said period before completion of a compaction stroke.

2. In a baling machine as defined in claim 1, wherein said means mounting said spring assembly to relatively urge said walls together to restrict the size of said outlet comprises, a pair of upright members pivotally connected at the lower ends thereof to said bottom wall on each side of said side walls, said upright members secured to said side walls at said outlet end thereof so that said side walls are moved toward each other when the upper ends of said upright members are moved toward each other, link means pivotally connected between the upper ends of said upright members and said spring assembly, said spring assembly comprising a shaft secured to said top wall to upstand therefrom, a pair of spring plate, means carrying one of said spring plates on said shaft adjacent said top wall, the other of said spring plates arranged about said shaft and connected between said link means above said one of said spring plates, and a compressed coiled spring disposed about said shaft between said spring plates so that said coiled spring reacts through said one of said spring plates and said shaft to said top wall to urge the other of said spring plates upwardly to urge said upright members toward each other through upward movement of said link means.

3. In a baling machine as defined in claim 2 wherein said means carrying one of said spring plates on said shaft comprises said lower portion of said shaft being threaded and a nut threaded on said shaft with said one of said spring plates carried about said shaft and on said nut, whereby the compression of said coiled spring is further adjustable by rotation of said nut on said shaft.

4. In a baling machine as defined in claim 2, wherein said hydraulic cylinder means comprises a one-way hydraulic cylinder carried on the upper side of said upper spring plate and about the upwardly extending portion of said shaft, said hydraulic cylinder having a piston rod therein, and means connecting the piston rod of said hydraulic cylinder to said upper end of said shaft so that the application of hydraulic fluid pressure of said pre-determined value to said hydraulic cylinder causes said piston rod to be moved to further compress said coiled spring between said pair of spring plates.

References Cited
UNITED STATES PATENTS

| | | | |
|---|---|---|---|
| 2,600,827 | 6/1952 | Almquist | 100—43 |
| 2,613,590 | 10/1952 | Graybill | 100—43 |
| 3,024,719 | 3/1962 | Englund | 100—192 |

BILLY J. WILHITE, *Primary Examiner.*